United States Patent
Yamazaki

(10) Patent No.: US 7,330,935 B2
(45) Date of Patent: Feb. 12, 2008

(54) SET ASSOCIATIVE CACHE SYSTEM AND CONTROL METHOD FOR CACHE MEMORIES

(75) Inventor: Shinya Yamazaki, Tokyo (JP)

(73) Assignee: NEC Corporation, Tokyo (JP)

(*) Notice: Subject to any disclaimer, the term of this patent is extended or adjusted under 35 U.S.C. 154(b) by 381 days.

(21) Appl. No.: 11/092,679

(22) Filed: Mar. 30, 2005

(65) Prior Publication Data

US 2005/0223173 A1   Oct. 6, 2005

(30) Foreign Application Priority Data

Mar. 31, 2004   (JP) ............... 2004-108286

(51) Int. Cl.
 *G06F 12/02*   (2006.01)
(52) U.S. Cl. .................. 711/128; 711/119; 711/133; 711/136; 711/159; 711/165
(58) Field of Classification Search ............... 711/119, 711/128, 133, 136, 159, 160, 165
See application file for complete search history.

(56) References Cited

U.S. PATENT DOCUMENTS 6,317,351 B2 * 11/2001  Choi et al. .................. 365/49

FOREIGN PATENT DOCUMENTS

| JP | H05-020193 A | 1/1993 |
|---|---|---|
| JP | H09-062582 A | 3/1997 |
| JP | 2004-30000 A | 1/2004 |
| JP | 2004-62377 A | 2/2004 |

* cited by examiner

*Primary Examiner*—Matthew Kim
*Assistant Examiner*—Hetul Patel
(74) *Attorney, Agent, or Firm*—Sughrue Mion, Pllc.

(57) ABSTRACT

A cache system comprises i (e.g., 2) groups of m (e.g., 2) ways and n (e.g., 2) sets of cache arrays, a set address decoder, a comparator, a cache address and cache management information. The set address decoder selects all or one of the i groups of cache arrays based on the cache address and cache management information, and selects a j-th set in the selected cache memories according to the cache address. The comparator selects a way from the selected set based on the cache management information, compares the block address of a cache block in the selected way with a requested block address to decide whether there is a cache hit or a miss, and select a replacement block based on LRU information

8 Claims, 17 Drawing Sheets

: EMPTY     : PROCESS UNIT 1     : PROCESS UNIT 2

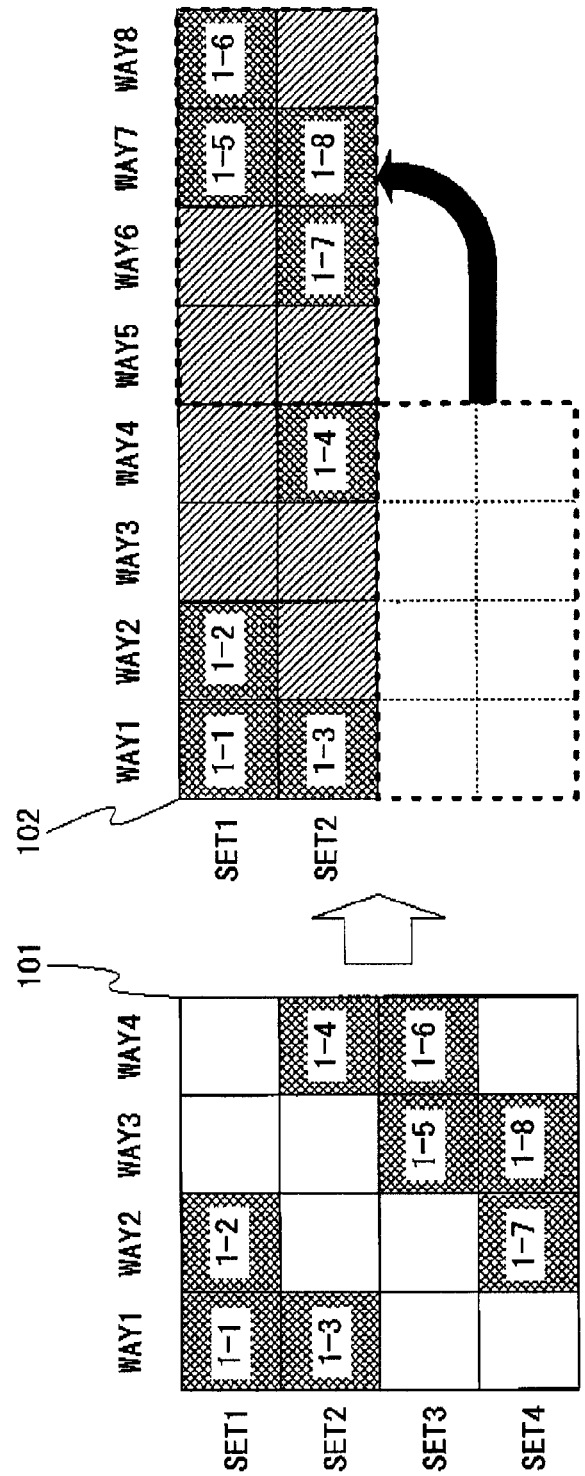
FIG.1A
FIG.1B

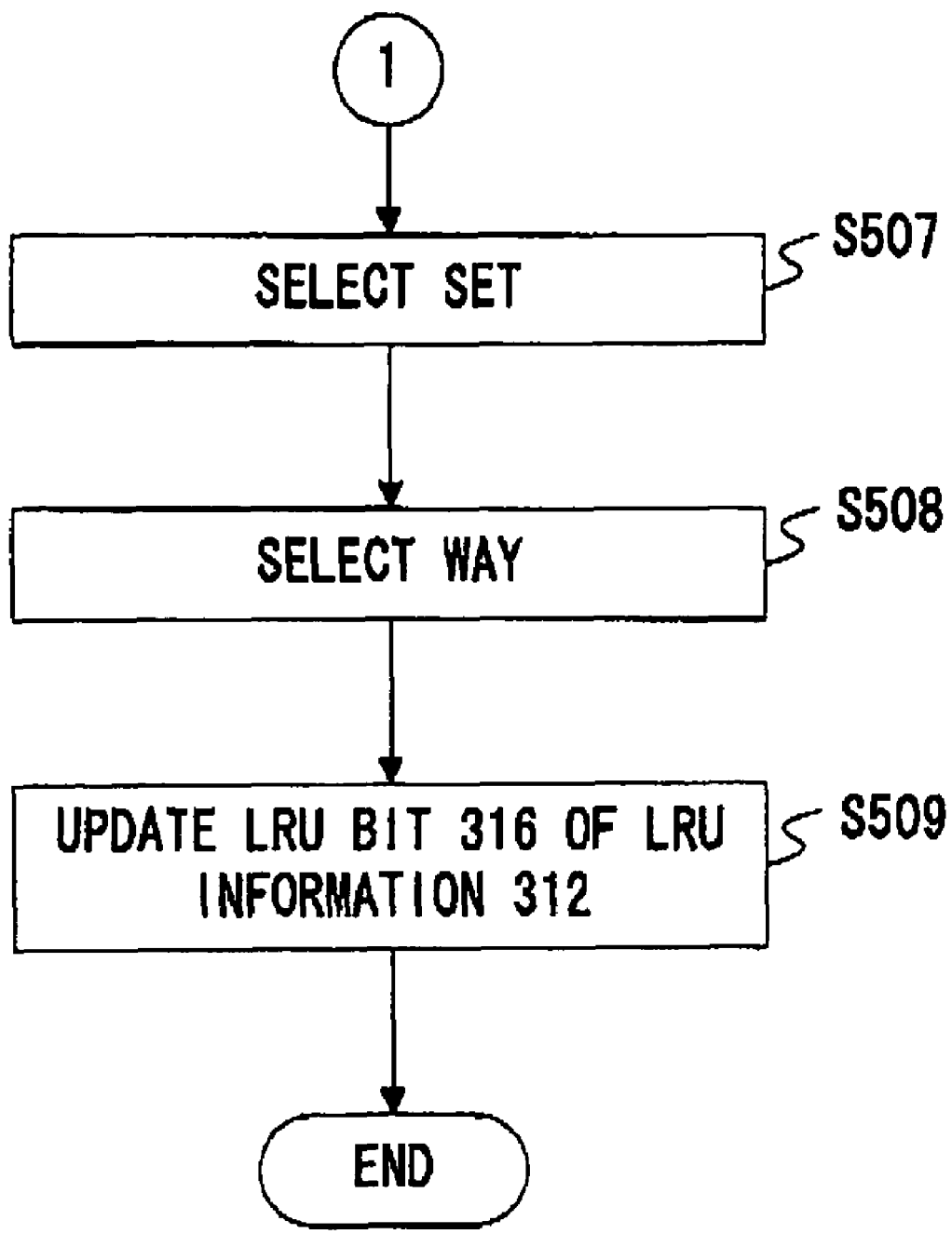

FIG. 6

| | | | | | | | | |
|---|---|---|---|---|---|---|---|---|
| OPERATION RESULT | LRU INFORMATION 312 | LRU BIT | 3←1←2←4 | 4←3←1←2 | 2←4←3←1 | 3←2←4←1 | 1←3←2←4 | 4←1←3←2 |
| | WAY SELECTOR 410 | WAY | WAY3 | WAY4 | WAY2 | WAY3 | WAY1 | WAY4 |
| | SET ADDRESS DECODER 320 | SET | SET4 | SET4 | SET 2,4 | SET 2,4 | SET 2,4 | SET 2,4 |
| INPUT | LRU INFORMATION 312 | EXTENTION BIT | WAY1:1 WAY2:2 WAY3:1 WAY4:2 | WAY1:1 WAY2:2 WAY3:1 WAY4:2 | WAY1:1 WAY2:3 WAY3:1 WAY4:2 | WAY1:1 WAY2:3 WAY3:1 WAY4:2 | WAY1:4 WAY2:3 WAY3:1 WAY4:2 | WAY1:4 WAY2:3 WAY3:1 WAY4:2 |
| | CACHE MANAGEMENT INFORMATION 311 | MEMORY SHARING INFORMATION | NONE | NONE | NONE | NONE | THREAD 3 | NONE |
| | | THREAD SYSTEM NO. | 1 | 2 | 3 | 1 | 4 | 2 |
| | | THREAD QUANTITY NO. | 2 | 2 | 3 | 3 | 4 | 4 |
| | | SYSTEM SYSTEM NO. | 1 | 1 | 1 | 1 | 2 | 1 |
| | | SYSTEM QUANTITY NO. | 1 | 1 | 2 | 2 | 2 | 2 |
| | CACHE ADDRESS 301 | SET ADDRESS | 11 | 11 | 1 | 1 | 1 | 1 |
| | | BLOCK ADDRESS | 1 | 1 | 11 | 11 | 11 | 11 |
| | | ACCESS NUMBER | 1 | 2 | 3 | 4 | 5 | 6 |

ACCESS ORDER →

FIG. 8
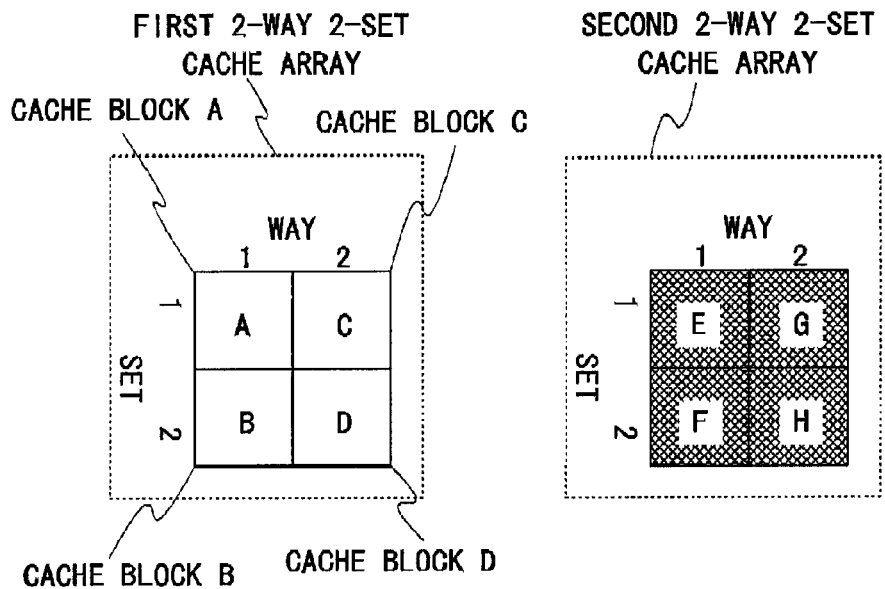
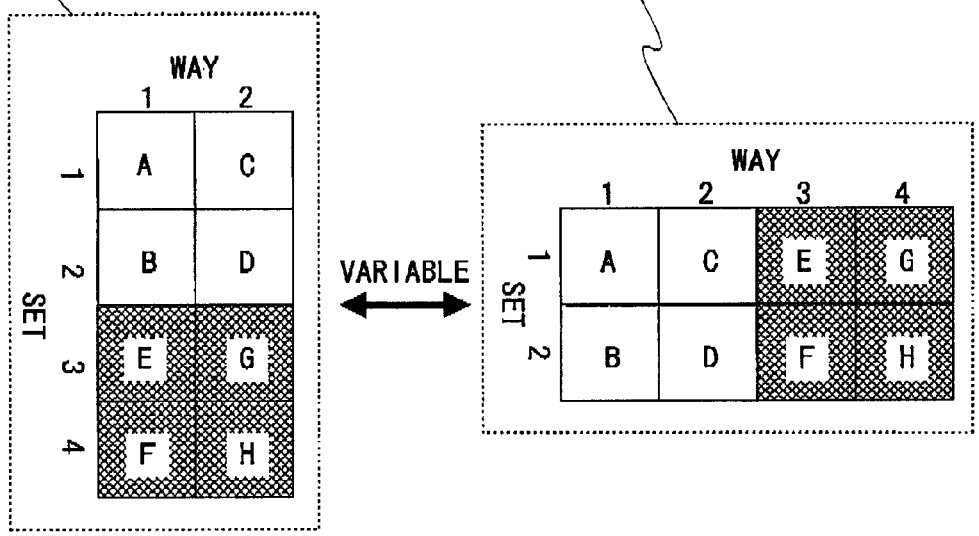

SET ASSOCIATIVE CACHE SYSTEM AND CONTROL METHOD FOR CACHE MEMORIES

BACKGROUND OF THE INVENTION

1. Field of the Invention

The present invention relates to a set associative cache system and a cache memory control method, which are capable of changing the number of sets and the number of ways while keeping the number of cache blocks constant.

2. Description of the Related Art

To cope with complexity of system and improvements on the semiconductor technology, at present various studies have been made on the technology of executing a plurality of process units in parallel using a multitask OS (Operating System), a multiprocessor, a multithread processor, an on-chip multiprocessor or the like.

The "process units" in this specification indicate a system, such as an OS, a processor, such as a CPU, a program or a process to be executed, and a thread.

Through the studies, a system capable of executing plural processes in parallel can be constructed. The recent trend is to appreciate concepts of designing a system compact and sharing resources for executing a plurality of process units in parallel, leading to development of various inventions.

To make processing faster, it is inevitable to use a cache memory, which is the essential technology at present, more efficiently. As the capacity of the cache memory has an upper limit, it is important to share a cache memory between plural processes which are executed in parallel.

Under the situation, inventions on cache sharing have been made actively. Sharing a cache requires a cache system architecture that has better performances to cope with complex processing.

There is a cache system proposed which divides the cache region by the number of process units, such as systems, processors or threads, and decides, beforehand, a cache region to be used by each process unit in order to improve the performance of a cache system. Those existing cache region dividing types have the following problems.

(1) Division by Cache Set

When a cache region to be used is allocated to each process unit, different process units cannot use a cache block directly, so that a cache mishit may occur.

(2) Division by Cache Way

When the number of ways usable per process unit is fixed, the number of ways may not be sufficient for a process unit which involves many cache requests.

When the number of ways usable per process unit is made variable, if there is the number of ways may not be sufficient for a process unit which involves many cache requests, most of the ways are used by the same process unit and the other process units substantially can hardly use the cache. That is, there is a cache mishit between different process units.

(3) Division by Cache Block Unit

As a process unit which can use one cache block is fixed, when different process units use the same cache block, the contents of the cache block are all replaced before usage. That is, there is a cache mishit between different process units.

An improved cache system is disclosed in Unexamined Japanese Patent Application KOKAI Publication No. H5-20193.

The cache system can select the number of ways, which is one factor to influence the hit ratio of a cache memory, during execution of a program. The cache system can change the configuration of hit checking means according to the selected number of ways.

Another improved cache system is disclosed in Unexamined Japanese Patent Application KOKAI Publication No. H9-2582.

The cache system can select the number of ways during execution of a program The cache system can use a plurality of simultaneously readable cache regions (cache arrays). This structure can reduce cache mishits originating from contention between tasks, such as an OS and a user program, according to the changed number of ways.

The cache systems disclosed in both Japanese publications are concerned with a technique for a single processor, not a technique for a multitask OS, a multiprocessor and a multithread. Therefore, the cache systems cannot reduce cache mishits per hit process unit under a multitask OS, a multiprocessor and a multithread.

The way selecting/comparing schemes disclosed in both Japanese publications designate the maximum value of a way when a cache request is made. When the systems take a configuration which involves fewer ways than the maximum number of ways, therefore, the efficiency of using the cache may drop.

SUMMARY OF THE INVENTION

Accordingly, it is an object of the invention to provide a set associative cache system which does not change the location and range of a cache block corresponding to the same cache address even when the number of sets and the number of ways are changed.

It is another object of the invention to provide a set associative cache system which does not reduce the available cache capacity even when the number of sets and the number of ways are changed.

To achieve the objects, according to first aspect of the invention, there is provided a set associative cache system comprising:

i groups of m ways and n sets of cache memories where i is a multiplier of 2 equal to or greater than 2, m and n are each a multiplier of 2 equal to or greater than 2;

a set selecting section which selects all or one of the i groups of cache memories based on a cache address and cache management information, and selects a j-th set of cache memories in the selected cache memories according to the cache address where j is an integer not less than 1 but not greater than n;

a way selecting section which selects a way based on the cache management information;

a decision section which compares a block address of a cache block in the way selected by the way selecting section with a block address of a requested cache block, and decides whether there is a cache hit or a miss; and a replacement selecting section which selects a replacement block based on a decision result from the decision section.

The cache address may include a block address and a set address. The cache management information may include information about a process unit.

The information about the process unit may include information indicative of a system status (the number of logical systems, the number of a system which has requested the cache), information indicative of a process status (the number of logical processes, the number of a process which has requested the cache), information indicative of a thread status (the number of logical threads, the number of a thread which has requested the cache), and memory sharing information.

The way selecting section may select a way based on LRU information of a cache block together with said cache management information. Th LRU (Least Recently Used) information is information that allows the cache system to decide which cache block is most recently used.

The replacement selecting section selects a replacement block based on the LRU information of the cache block together with the cache management information. Because of limitation to the size of the cache region usable by each process unit, the replacement of a cache block is necessary to erase an old cache in a process unit based on the LRU information and to secure a region where a new cache can be saved.

The way selecting section selects a way based on LRU information of a cache block and information on process allocation to each way together with the cache management information. The replacement selecting section selects a replacement block based on the LRU information of the cache block and the information on process allocation to each way together with the cache management information.

Under the control, the cache system functions, for example, as a cache system having two configurations: m ways and (i×n) sets set associative caches and (i×m) ways and n sets set associative caches.

In this case, the set associative cache system is characterized in that a location of a cache block corresponding to a same cache address does not change even when a number of sets and a number of ways are changed. The set associative cache system is also characterized in that an available cache capacity does not change even when a number of sets and a number of ways are changed.

According to the second aspect of the invention, there is provided a method of controlling a set associative cache memory, comprising, for i groups of m ways and n sets of cache memories:

selecting all or one of the i groups of cache memories based on a cache address and cache management information, and selecting a j-th set of cache memories in the selected cache memories according to the cache address;

selecting a way based on the cache management information;

comparing a block address of a cache block in the selected way in the selected set with a requested block address in the cache address, and deciding whether there is a cache hit or a miss; and selecting a replacement block based on a decision result.

The structure of the invention can allow a cache system to be used by adequately changing the number of sets and the number of ways.

BRIEF DESCRIPTION OF THE DRAWINGS

These objects and other objects and advantages of the present invention will become more apparent upon reading of the following detailed description and the accompanying drawings in which:

FIG. 1 is a diagram conceptually illustrating the configuration of sets and ways of a cache system according to one embodiment of the invention which are changed by a cache request;

FIG. 6 is a diagram exemplifying the actual operation of the 2-4 way and 4-2 set associative cache system according to the embodiment;

FIG. 8 is a diagram showing the structure of the 2-4 way and 4-2 set associative cache system according to the embodiment;

DETAILED DESCRIPTION OF THE PREFERRED EMBODIMENT

A cache system according to one embodiment of the invention will be described below with reference to the accompanying drawings.

The cache system is a variable m-way n-set set associative cache system which can allow a cache controller to change the cache configuration according to a change in the number of process units (system, process and thread).

FIG. 1 is a diagram illustrating the outline of the cache system according to the embodiment.

A cache system 101 shown in FIG. 1A is a 4-way 4-set set associative cache system.

A copy of each memory block for a process unit 1 is written in a cache block as a cache by cache controller.

A cache system 102 shown in FIG. 1B is the cache system 101 whose configuration is changed by the cache controller as a process unit 2 newly occurs at the next time.

The reconfigured cache system is a 8-way 2-set set associative cache system. Copies of memory blocks for the process unit 1 and the process unit 2 are written in the cache block as a cache by the cache controller.

Cache blocks in each set are used separately for the process unit 1 and the process unit 2 except for an empty region.

As apparent from FIGS. 1A and 1B, the cache system has a feature such that even when the configuration of the cache system is changed, the positions of copies of memory blocks for the process unit 1 on the cache block are not changed.

According to the cache system of the embodiment of the invention, the cache controller can separate each set into cache blocks according to a change in the number of process units, and change the configuration of the number of ways and the number of sets to another preset configuration.

Figure 2:
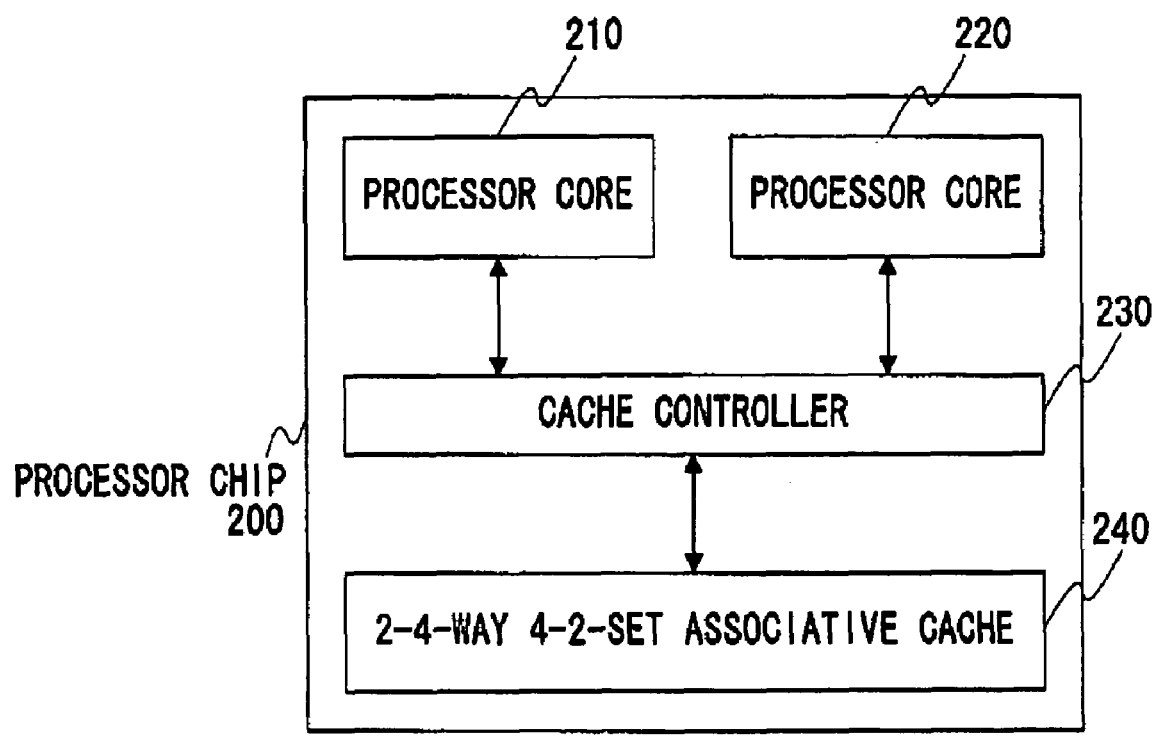
FIG. 2 is a diagram showing one example of the architecture of a processor.

FIG. 2 is a diagram showing the architecture of a processor.

A processor chip 200 comprises a processor core 210, a processor core 220, a cache controller 230, and a 2-4-way 4-2-set set associative cache system 240.

The processor core 210 has a multithread architecture capability and can substantially process a plurality of threads (two in the embodiment) at a time.

Figure 3:
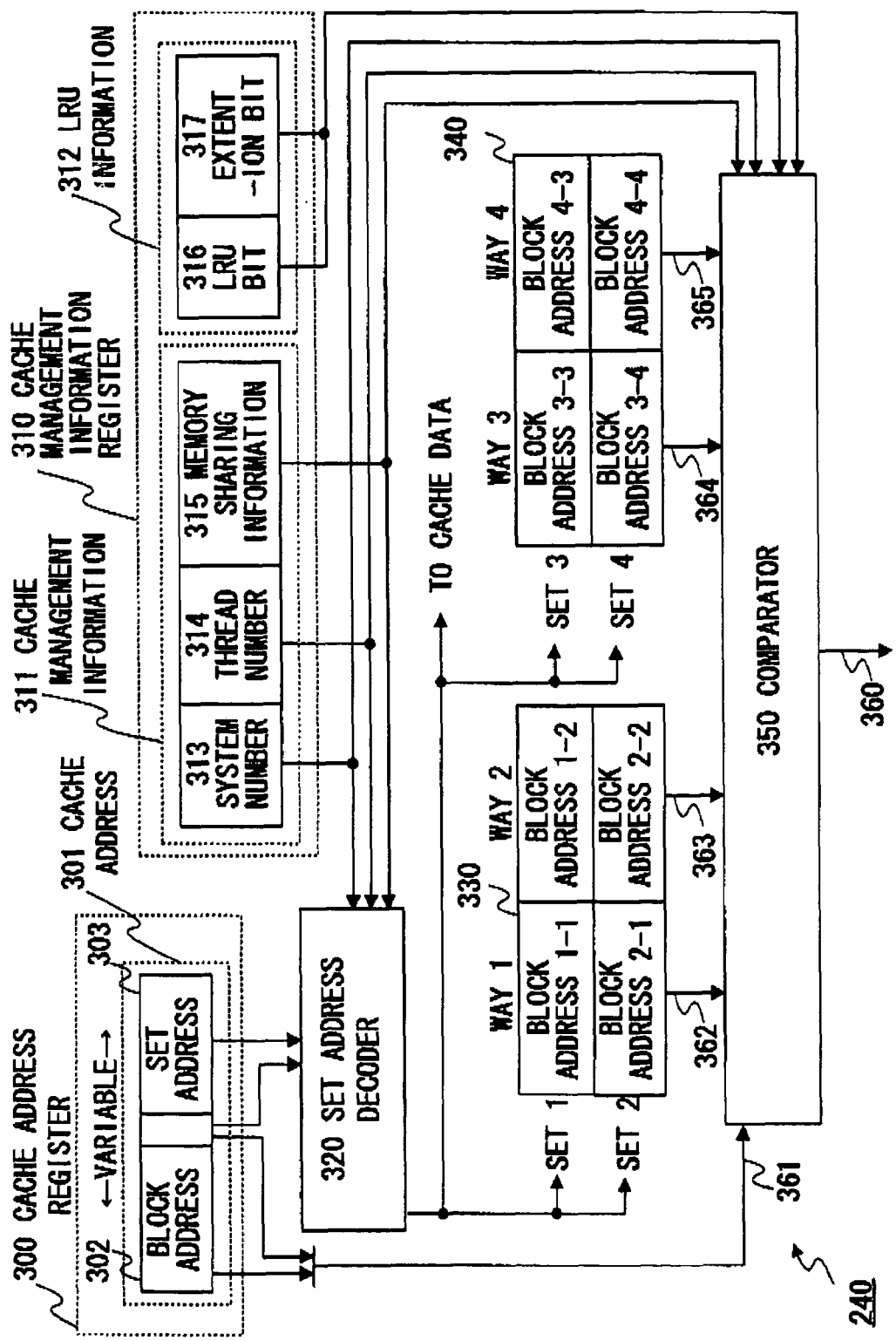
FIG. 3 is a diagram showing the general structure of the cache system.

FIG. 3 is a diagram showing an example of the configuration of the 2-4-way 4-2-set set associative cache system 240 mounted on the processor chip 200 shown in FIG. 2.

The cache controller 230 can change the configuration of the 2-4-way 4-2-set set associative cache system 240 to another preset configuration. The 2-4-way 4-2-set set associative cache system 240 can switch the configuration between a 4-way 2-set cache configuration and a 2-way 4-set cache configuration in response to an instruction from the cache controller 230.

As shown in FIG. 3 the cache 240 comprises a cache address register A-REG 300, a cache management information register M-REG 310, a set address decoder 320, set address decoder 320, a cache array 330, a cache array 340, and a comparator 350.

The cache address register A-REG 300 stores a cache address 301 supplied from the cache controller 230.

The cache address 301 includes a block address 302 and a set address 303.

The bit width of each of the block address 302 and the set address 303 changes according to the number of sets which is to be changed by an instruction from the cache controller 230 (either four set or two sets in this example).

The bit width of the block address 302 is determined depending on which one of the two cache configurations the cache controller 230 uses.

The number of ways per set is two for the 2-way 4-set cam configuration, while the number of ways per set is four for the 4-way 2-set cache configuration.

Therefore, the block address 302 requires one bit for the case of four sets, and requires two bits for the case of two sets.

According to the embodiment, for the 2-way 4-set cache configuration, "0" and "1" of one bit are used in the block address 301 to discriminate two ways. This make it possible to discriminate between the first block and the second block, or between the third block and the fourth block.

For the 4-way 2-set cache configuration, "00", "01", "10" and "11" of two bits are used in the block address 302 to discriminate four ways from one another. This makes it possible to discriminate the first to fourth blocks from one another.

The bit width of the set address 303 is determined depending on which one of the two cache configurations the cache controller 230 uses.

The number of sets per way is four for the 2-way 4-set cache configuration, while the number of sets per way is two for the 4-way 2-set cache configuration.

Therefore, the set address 303 requires two bits for the case of four sets, and requires one bit for the case of two sets.

According to the embodiment, for the 2-way 4-set cache configuration, "00", "01", "10" and "11" of two bits are used in the set address 303 to discriminate four sets from one another. This makes it possible to discriminate the first to fourth blocks from one another.

For the 4-way 2-set cache configuration, "0" and "1" of one bit are used in the set address 303 to discriminate two sets. This makes it possible to discriminate between the first block and the second block, or between the third block and the fourth block.

The cache management information register M-REG 310 includes cache management information 311 and LRU information 312 supplied from the cache controller 230.

The cache management information 311 is set by an input made from software, hardware, or firmware. In the embodiment, the cache management information 311 includes a system number 313, a thread number 314 and memory sharing information 315.

The system number 313 includes the number of systems (the number of logics) when a cache request has been made, and the number of the system that has requested a cache.

The thread number 314 includes the number of threads when a cache request has been made, and the number of the thread that has requested a cache.

The memory sharing information 315 includes information which specifies threads sharing a memory.

When the system is logically divided into two by the processor cores 210 and 220 shown in FIG. 2, and the first one of the two systems requests a cache, information such that the number of systems (the number of logics) when a cache request has been made is "2" and the number of the system that has requested a cache is "1" is set in the system number 313 by the cache controller 230.

When three threads are executed in parallel by the processor cores 210 and 220 shown in FIG. 2, and the second thread has requested a cache, information such that the number of threads when a cache request has been made is "3" and the number of the thread that has requested a cache is "2" is set in the thread number 314 by the cache controller 230.

When the thread that has requested a cache shares a memory with any one of the other threads which are executed in parallel, the number of that thread is set in the memory sharing information 315 by the cache controller 230.

Based on the cache address 301 and the cache management information 311, the set address decoder 320 selects a set which is used by the process unit that has requested a cache. Decoding rules will be discussed late.

The cache system in FIG. 3 comprises two groups of 2-way 2-set cache arrays.

Each of the cache arrays 330 and 340 comprises four cache blocks each of which is allocated to one of sets 1 to 4 and one of ways 1 to 4.

The set address decoder 320 selects the set of the cache to be used by the process unit that has requested a cache.

The cache arrays 330 and 340 sends the block address, written in the selected set, to the comparator 350.

Each cache block included in the cache arrays 330 and 340 has a specific block address that distinguishes the cache block from the other cache blocks.

The comparator 350 perform a decision on cache hit/miss based on the block address 302 and the cache management information 311. Then, the comparator 350 generates a mishit signal indicating whether it is a cache hit or a miss, and sends the signal to the cache controller. 230.

Figure 4:
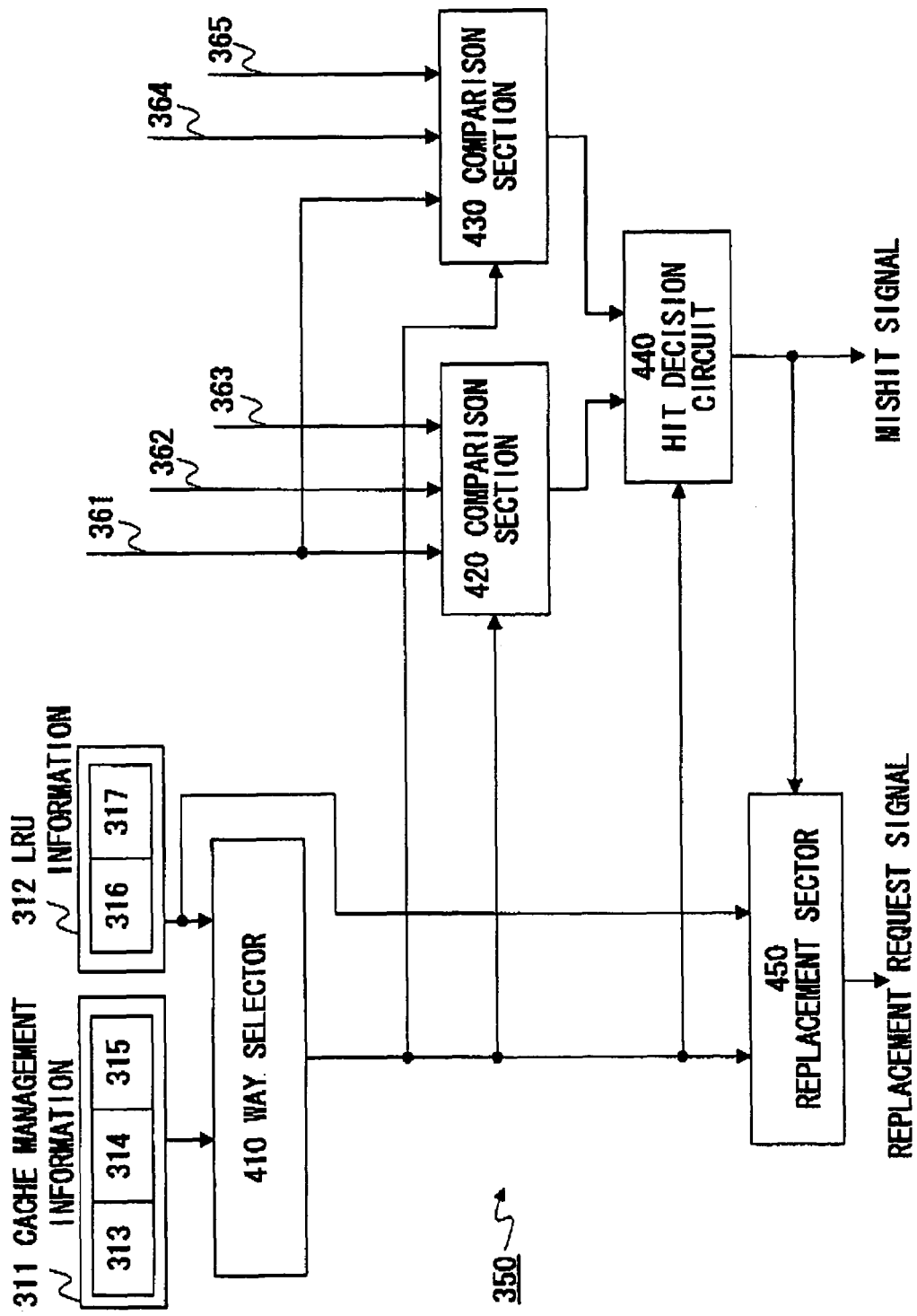
FIG. 4 is a block diagram showing one example of a comparator shown in FIG. 3.

FIG. 4 is a block diagram showing the comparator 350 in detail.

Based on the cache management information 311 and the LRU information 312, a way selector 410 selects a way region to be used by the process unit that has requested a cache.

The LRU information 312 includes an LRU bit 316 holding information indicating which way is the most recently used one, and an extension bit 317 holding information about a way division status when a cache request has been made.

The way selector 410 acquires the number of sets and the number of ways when a cache request has been made, from the contents of the LRU information 312 and the extension bit 317.

The cache address register A-REG 300 sends a requested block address signal 361 to comparison sections 420 and 430.

The cache array 330 sends block address signals 362 and 363 indicating cache addresses written in all the cache blocks to the comparison sections 420 and 430. The cache army 340 sends block address signals 364 and 365 indicating cache addresses written in all the cache blocks to the comparison sections 420 and 430.

The way selector 410 sends the numbers of the selected ways to the comparison sections 420 and 430.

The comparison section 420 compares the requested block address with a cache address in the cache array 330 based on information input from the cache address register A-REG 300, the cache arrays 330 and 340, and the way selector 410. Then, the comparison section 420 sends a comparison result to a hit decision circuit 440.

The comparison section 430 compares the requested block address with a cache address in the cache array 330 based on information input from the cache address register A-REG 300, the cache arrays 330 and 340, and the way selector 410. Then, the comparison section 430 sends a comparison result to a hit decision circuit 440.

The hit decision circuit 440 performs a decision on cache hit/miss based on inputs from the comparison sections 420 and 430, and the way selector 410.

A replacement sector 450 selects a cache block to be replaced when there is a cache mishit based on information held by the LRU bit 316.

In the embodiment, it is the 2-way 4-set cache configuration when the number of systems which are executed in parallel is 1, and is the 4-way 2-set cache configuration when the number of systems which are executed in parallel is 2. The cache controller 230 takes either one of the two configurations according to the number of systems that are executed in parallel.

(Description of Operation)

The operation of the 2-4-way 4-2-set variable m-way n-set set associative cache system having the above-described structure will be discussed below.

FIG. 5 is a flowchart illustrating the operation of the cache system to select a set and a way. FIG. 6 shows a diagram of the results of the set address decoder 320 and the way selector 410 having respectively decided a set and a way.

For example, the status of the cache system for an access number 1 in FIG. 6 will be discussed. The block address a cache at which has been requested by the cache controller 230 is "1" and the set address is "11". The number of systems that are executed in parallel is "1" and the number of the system that has requested a cache is "1". The number of threads that are executed in parallel is "2" and the number of the thread that has requested a cache is "1". There is no memory sharing between two threads.

As the operational results in this case, the set address decoder 320 selects the set 4 and the way selector 410 selects the way 3.

In FIG. 6, the system status changes in the order of access numbers 1, 2, 3, 4, 5 and 6.

From the access number 1 to the access number 2 in FIG. 6, the number of systems saved at the system number 313 in the cache management information 311 by the cache controller 230 is "1". Accordingly, from the access number 1 to the access number 2, the cache system takes the 2-way 4-set cache configuration.

From the access number 3 to the access number 6 in FIG. 6, the number of systems saved at the system number 313 in the cache management information 311 by the cache controller 230 is "2". Accordingly, from the access number 1 to the access number 2, the cache system takes the 4-way 2-set cache configuration.

FIG. 7 is a diagram illustrating block addresses which are selected by the set address decoder 320 and the way selector 410 and are targeted for a decision on cache miss/hit.

The detailed description of the operation for each of the access numbers 1 to 6 will be given below referring to a flowchart in FIG. 5A and FIG. 5B.

First, if a cache request is generated from the processor core 210 or 220, the cache controller 230 uses the 2-way 4-set cache configuration as it is when the number of systems that are executed in parallel is "1". When the number of systems that are executed in parallel is changed to "2" from "1" (step S501:Yes in FIG. 5A), the cache controller 230 changes the configuration to the 4-way 2-set cache configuration (step S502 in FIG. 5A).

Figure 5A:
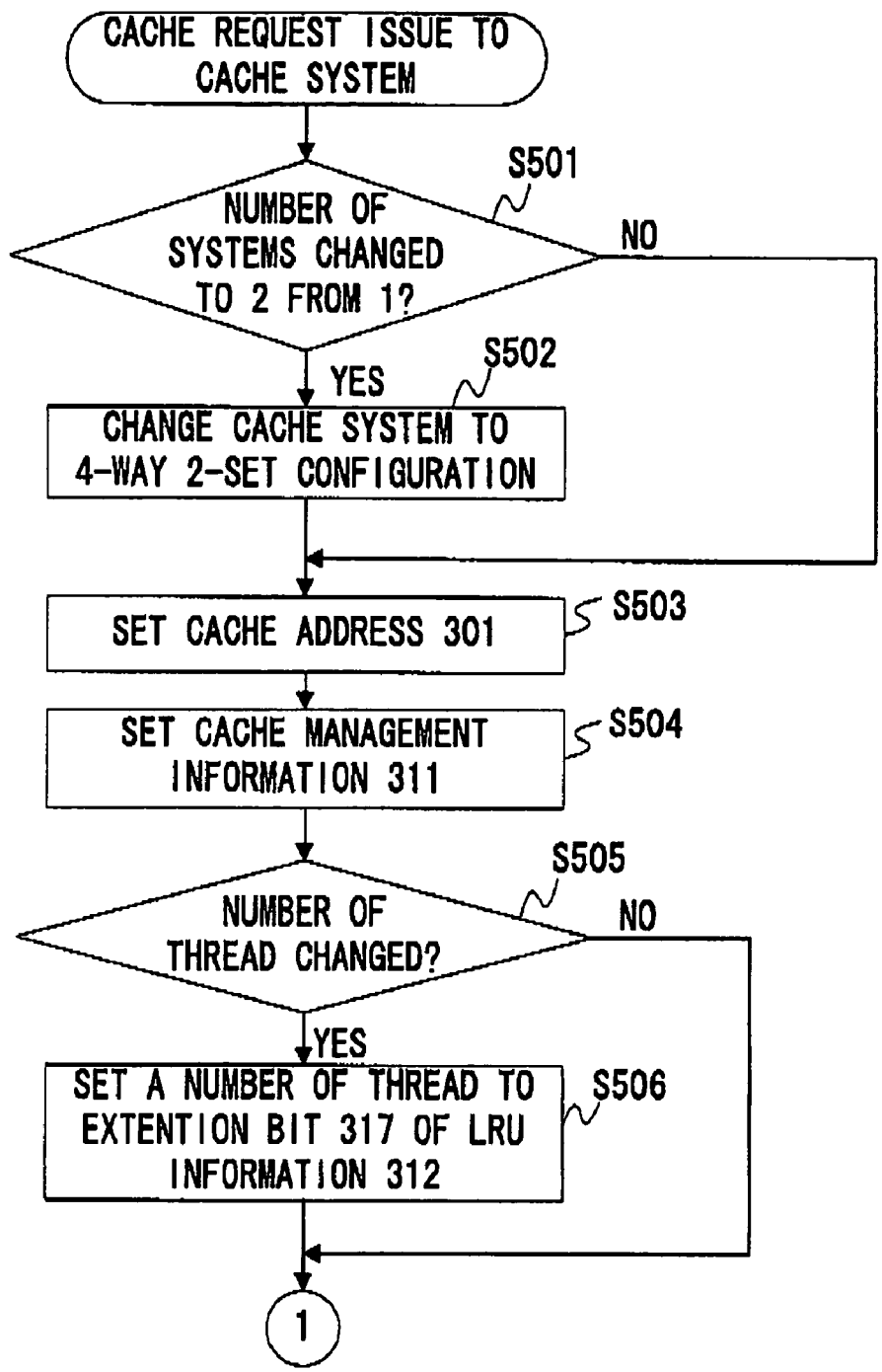
FIG. 5 is a flowchart illustrating operation of a 2-4 way and 4-2 set associative cache system according to the embodiment when a cache request is made.

Next, the cache controller 230 sets the request cache address in the cache address 301 (step S503 in FIG. 5A), and sets the system number, the thread number and the memory sharing status in the cache management information 311 (step S504 in FIG. 5A).

When the number of treads that are executed in parallel is changed (step S505:Yes in FIG. 5A), the cache controller 230 sets the number of the thread that has requested a cache in the extension bit 317 of the LRU information 312 (step S506 in FIG. 5A).

Figure 7A:
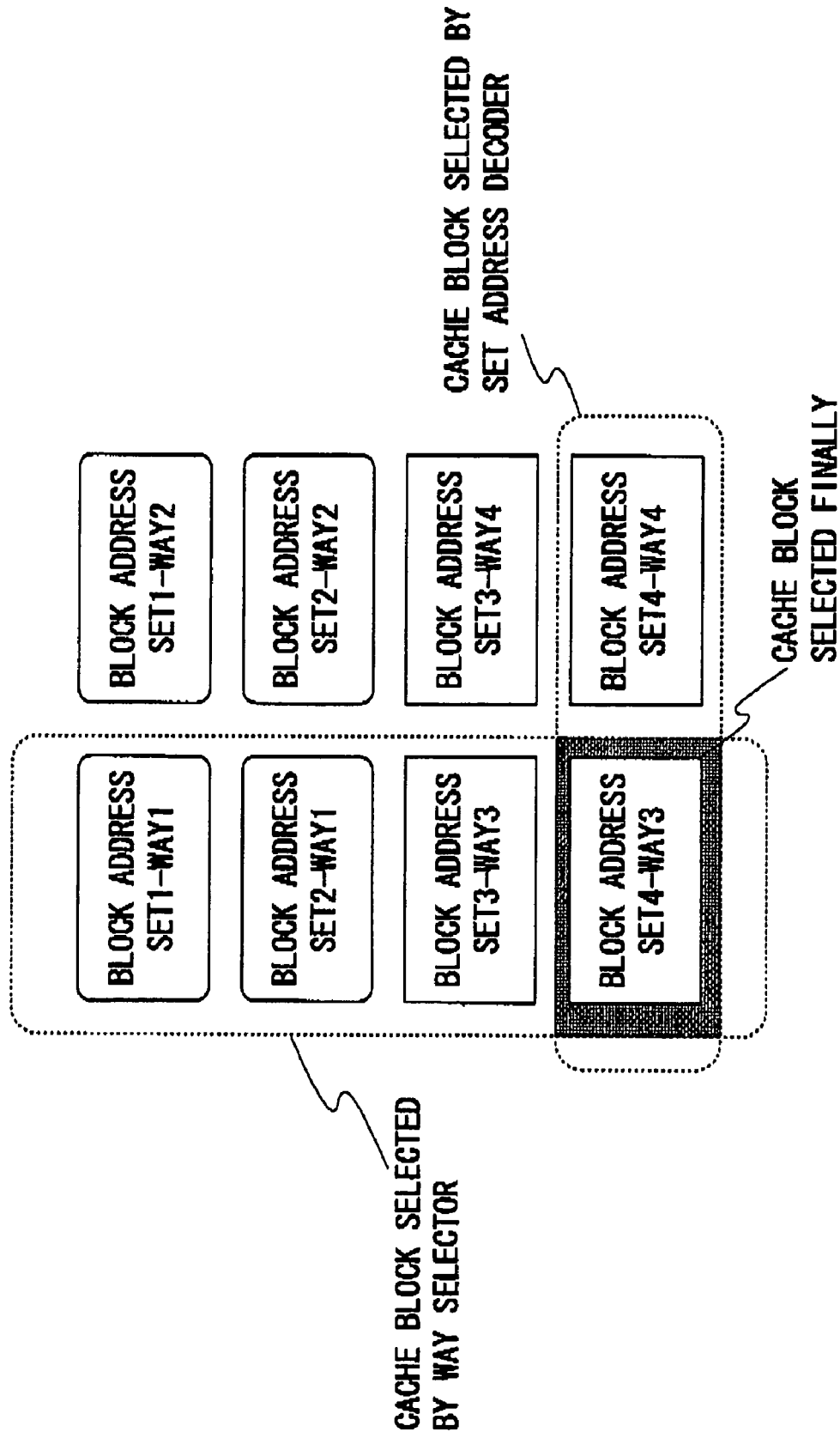
FIG. 7 is a detailed diagram illustrating the results of the operational example in FIG. 6 of the 2-4 way and 4-2 set associative cache system according to the embodiment.

When the access number is "1", the set address 303 is "11", so that the set address decoder 320 selects the set 4 as shown in FIG. 7A (stop S507 in FIG. 5B).

The thread number 314 of the cache management information 311 written by the cache controller 230 is "1". From information of the extension bit 317 of the LRU information 312 written by the cache controller 230, there are two ways, the way 1 and the way 3, that are used by the thread 1. It is only the way 3 in the two ways that is present in the set 4 selected previously by the set address decoder 320. Therefore, the way selector 410 selects the way 3 (step S508 in FIG. 5B).

As a result, for the access number 1, the cache system selects the cache block "way 3 in set 4" as shown in FIG. 7A.

The selected way numbers, when sorted in the least recently used (LRU) order, are 3, 1, 2, and 4. Therefore, information of the LRU bit 316 is updated by the cache controller 230 to the contents indicating that the ways selected in the past are 3, 1, 2, and 4 in the LRU order (step S509 in FIG. 5B).

Figure 7B:
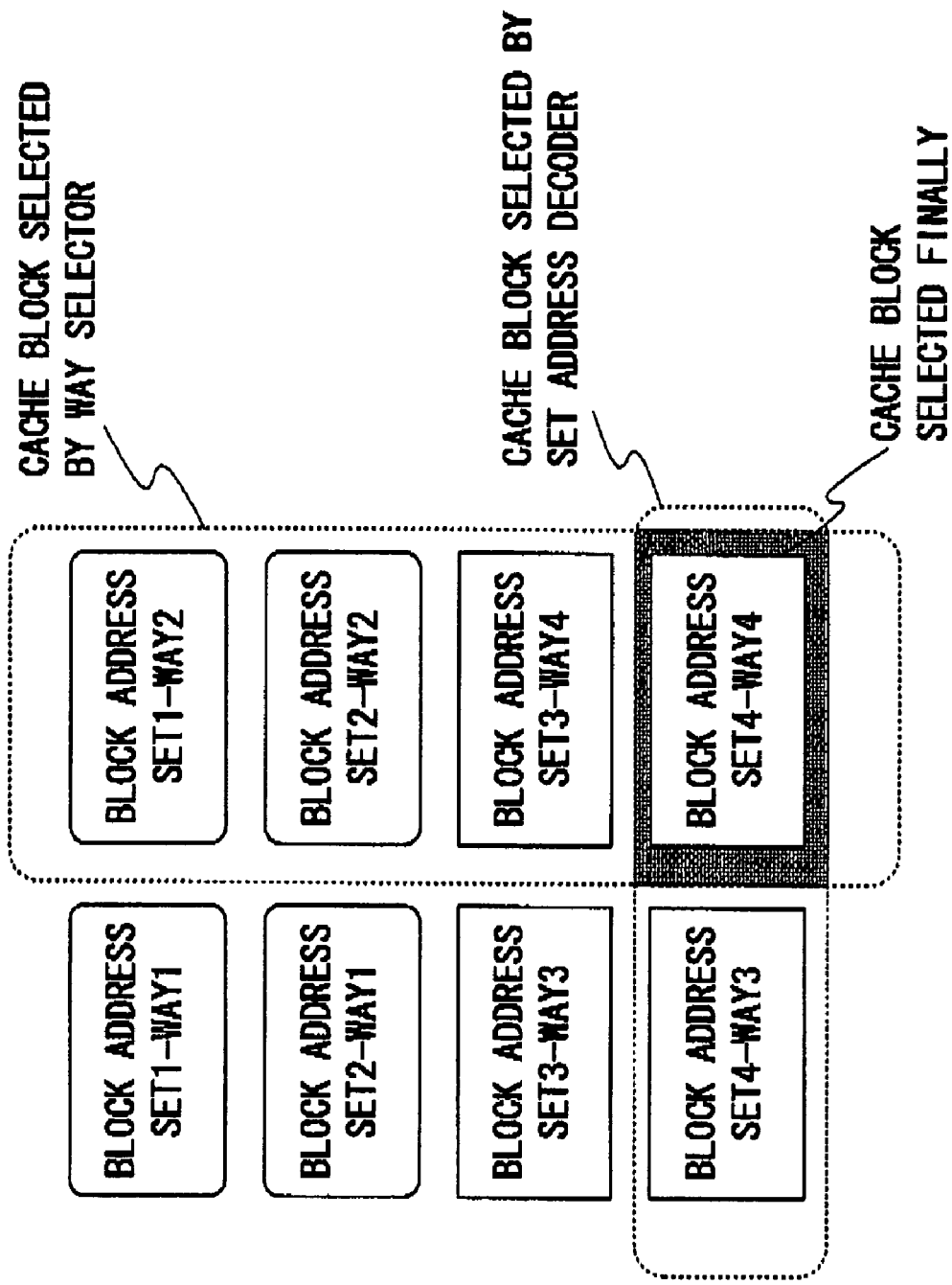

For the access number 2, processing is carried out as per the case of the access number 1, and "way 4 in set 4" is selected by the set address decoder 320 and the way selector 410 as shown in FIG. 7B.

Information of the LRU bit 316 is updated by the cache controller 230 to the contents indicating that the ways selected in the past are 4, 3, 1, and 2 in the LRU order. Because the number of threads has not been changed, information of the LRU information 312 is not updated and is held unchanged.

When the access number is "3", the number of systems that are executed in parallel is changed to "2" from "1", so that the cache system changes the configuration to the 4-way 2-set cache configuration. As the number of threads is changed to "3" from "2", information of the extension bit 317 is updated by the cache controller 230 to the contents that the thread 3 uses the way 2.

For the set address 303 being "1", the set address decoder 320 selects both of the set 2 and the set 4.

The thread number 314 of the cache management information 311 written by the cache controller 230 is "3". From information of the extension bit 317 of the LRU information 312 written by the cache controller 230, it is only the way 2 that is used by the thread 3. Therefore, the way selector 410 selects the way 2.

Figure 7C:
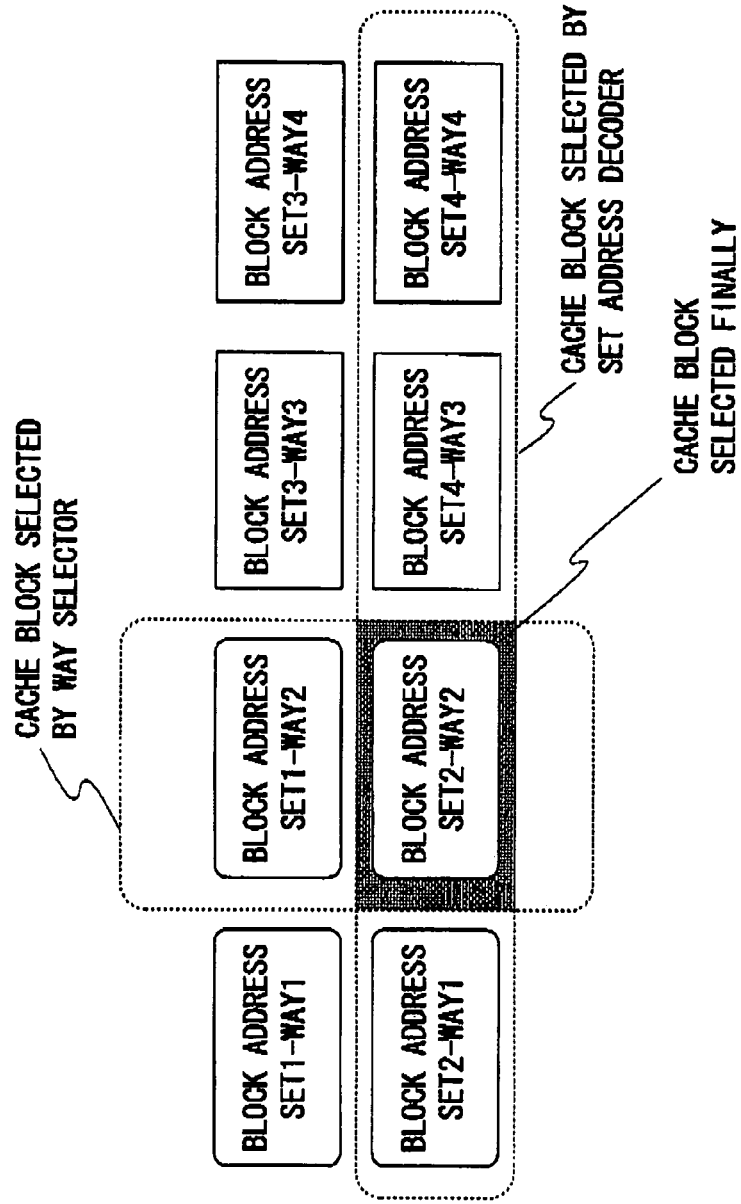

As a result, for the access number 3, the cache system selects the cache block "way 2 in sets 2, 4" as shown in FIG. 7C.

Information of the LRU bit 316 is updated by the cache controller 230 to the contents indicating that the ways selected in the past are 2, 4, 3, and 1 in the LRU order.

When the access number is "4", the set address decoder 320 selects both of the set 2 and the set 4 as per the case of the access number 3. From information of the extension bit 317 of the LRU information 312 written by the cache controller 230, it is both the way 1 and the way 3 that are used by the thread 1. From information of the LRU bit 316, it is the way 3 in the way 1 and the way 3 that is most recently used. Therefore, the way selector 410 selects the way 3.

Figure 7D:
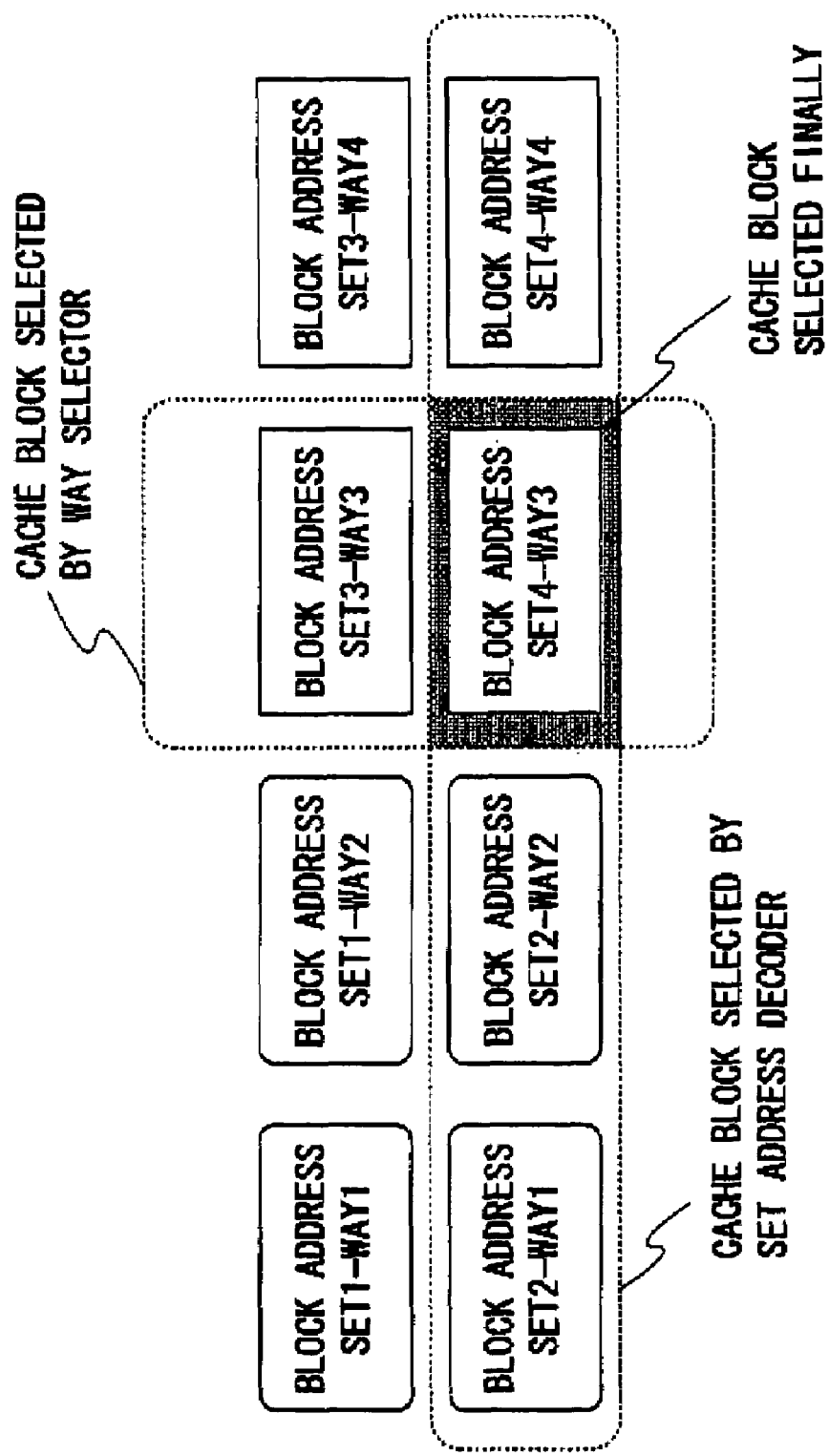

As a result, for the access number 4, the cache system selects the cache block "way 3 in sets 2, 4" as shown in FIG. 7D.

Information of the LRU bit 316 is updated by the cache controller 230 to the contents indicating that the ways selected in the past are 3, 2, 4, and 1 in the LRU order. Because the number of threads has not been changed, the extension bit 317 is not updated and is held unchanged.

For the access number 5, as the number of t is changed to "4" from "3", information of the extension bit 317 is updated by the cache controller 230 to the contents that the thread 4 uses the way 1.

The set address decoder 320 selects both of the set 2 and the set 4 as per the case of the access number 3. From information of the extension bit 317 of the LRU information 312 written by the cache controller 230, it is only the way 1 that is used by thread 4. Therefore, the way selector 410 selects the way 1.

For the access number 5, information that the thread 4 shares a memory with the thread 3 is set in the memory sharing information 315 by the cache controller 230. The way selector 410 inputs the memory sharing information 315 to the hit decision circuit 440.

Figure 7E:
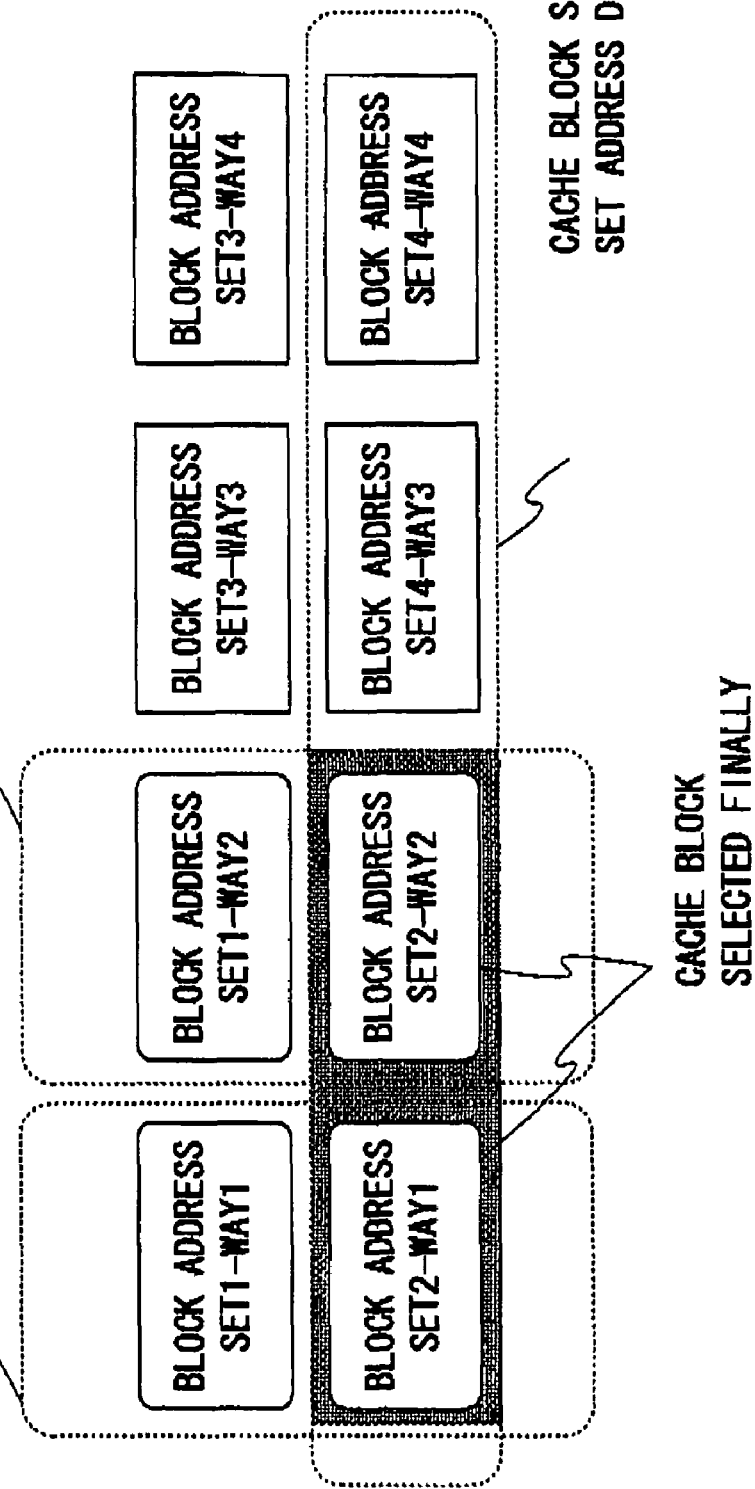

As a result, for the access number 5, the cache system selects two cache blocks, the cache block "way 1 in sets 2, 4" and the cache block "way 2 in sets 2, 4", as shown in FIG. 7E, and makes a decision on a cache hit/miss.

Information of the LRU bit 316 is updated by the cache controller 230 to the contents indicating that the ways selected in the past are 1, 3, 2, and 4 in the LRU order.

For the access number 6, the set address decoder 320 selects both of the set 2 and the set 4 as per the case of the access number 3. From information of the extension bit 317 of the LRU information 312 written by the cache controller 230, it is only the way 4 that is used by the thread 2. Therefore, the way selector 410 selects the way 4.

Figure 7F:
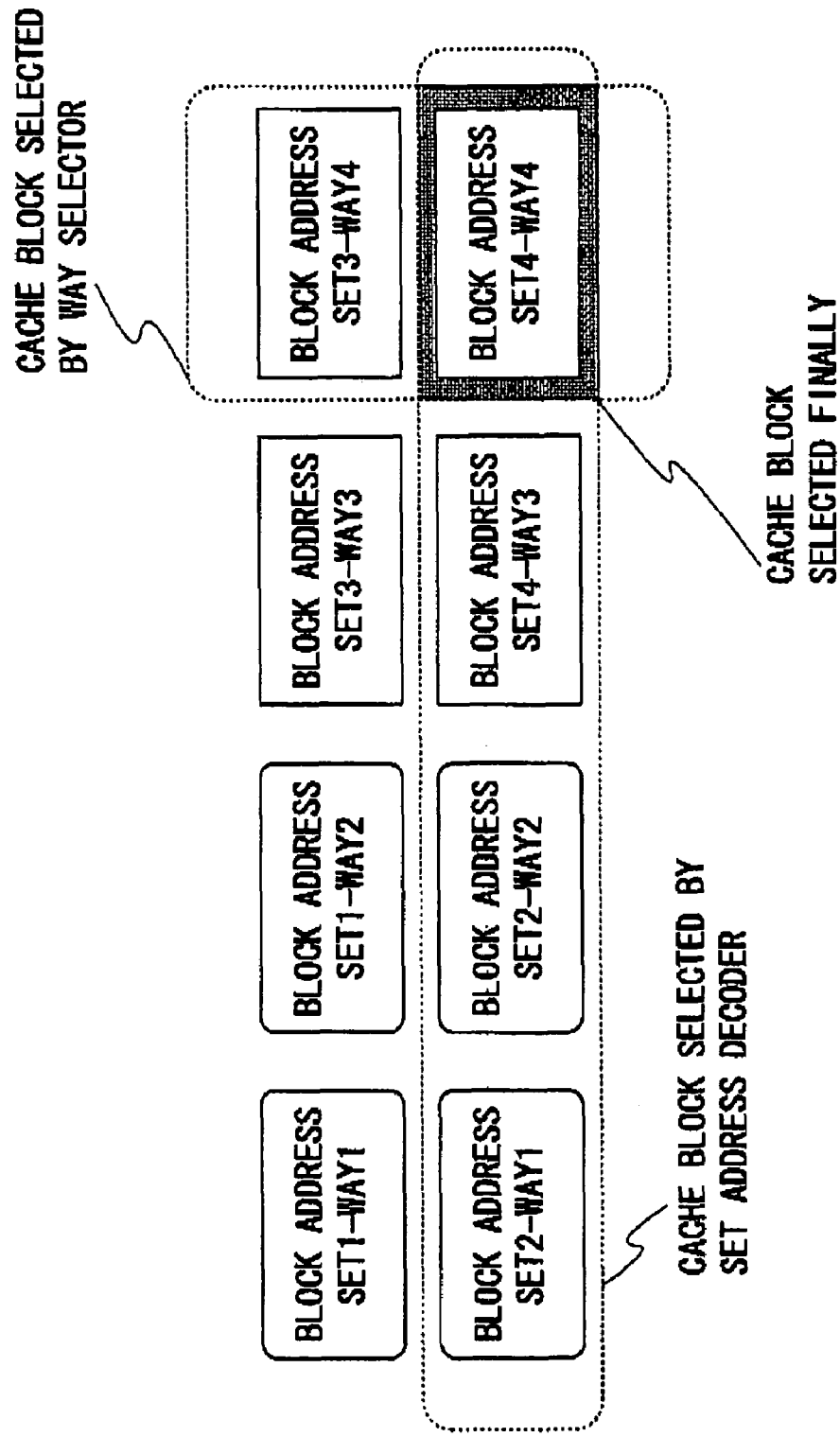

As a result, for the access number 6, the cache system selects the cache block "way 4 in sets 2, 4" as shown in FIG. 7F.

Information of the LRU bit 316 is updated by the cache controller 230 to the contents indicating that the ways selected in the past are 4, 1, 3, and 2 in the LRU order.

As apparent from the foregoing description, the following effects can be acquired by driving the cache system while changing the configuration of the cache system.

As the number of ways to be used by each process unit can be increased according to the number of process units, a contention-originated miss in a process unit and between process units can be prevented (Effect 1).

Even when the configuration of the cache system is changed, the positions of the cache blocks designated by the cache address are not changed. This can reduce cache miss hits copies which would be originated from alteration of the configuration of the cache block (Effect 2).

As a cache replacement block is decided by referring to the LRU bit at the time of changing the region of each way, contention-originated misses can be reduced (Effect 3).

The invention is not limited to the embodiment, but may be modified and adapted in various forms.

In the configuration in FIG. 8, for example, two cache arrays (330 and 340) of four blocks (2 sets×2 ways) are prepared and selection of a set and selection of a way are controlled in such a way as to be able to switch between the 2-way 4-set cache configuration and the 4-way 2-set cache configuration.

For the 2-way 4-set cache configuration, the set 1 and the set 2 present in the first cache array are respectively associated with the way 1 and the way 2, and the set 3 and the set 4 present in the second cache array are respectively associated with the way 1 and the way 2. In the cache system, therefore, the cache controller can arbitrarily change the configuration to one of the two configurations.

Figure 9:
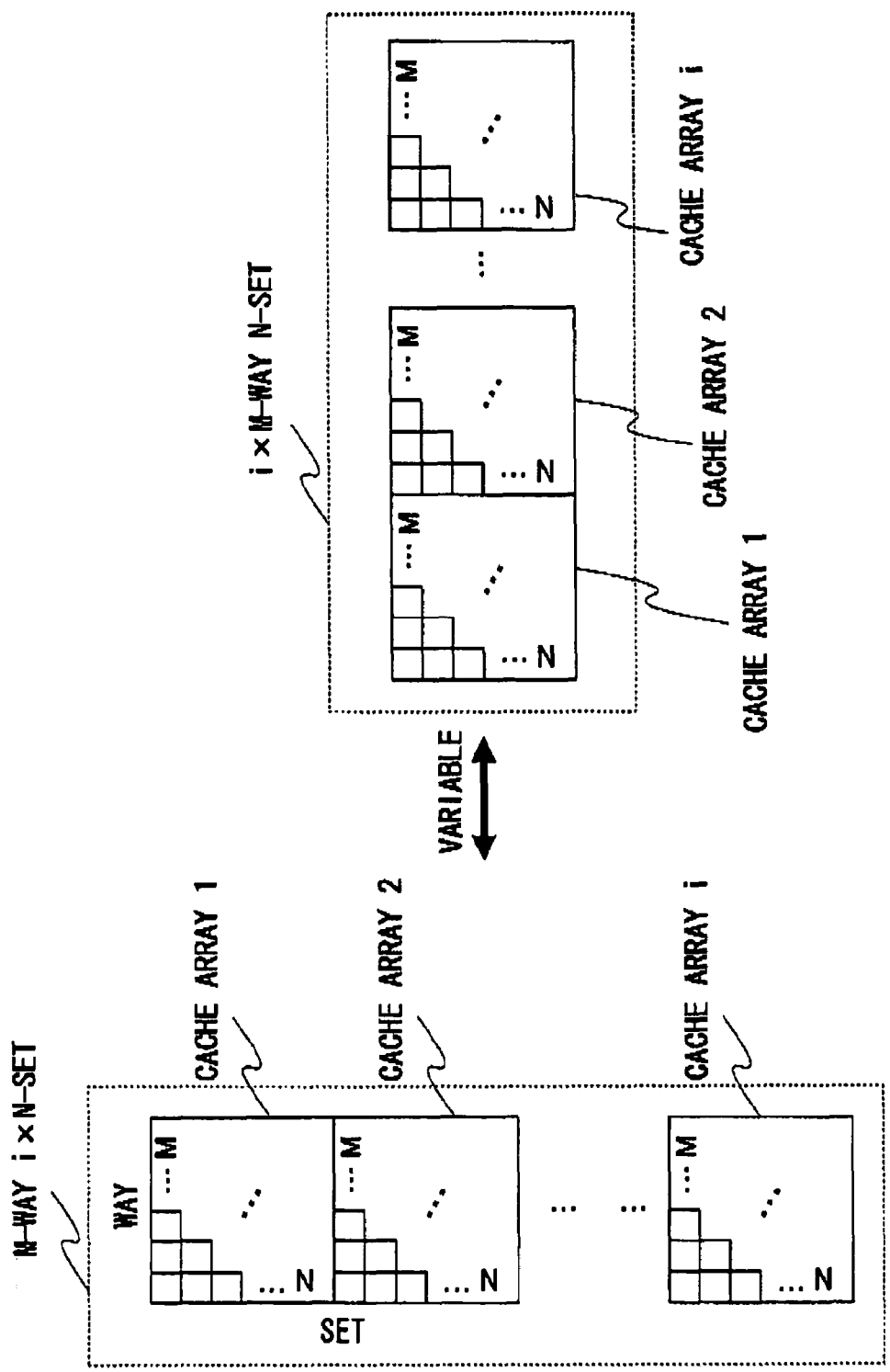
FIG. 9 is a diagram exemplifying the structure of a m-way (n×i)set and (m×i)-way n-set set associative cache system.

In the configuration in FIG. 9, for example, i groups of m-way and n-set cache arrays (equivalent to the cache arrays 330 and 340 in FIG. 1) are prepared where m is a multiplier of 2 equal to or greater than 2, n is a multiplier of 2 equal to or greater than 2, and i is a multiplier of 2 equal to or greater than 2.

Figure 10A:
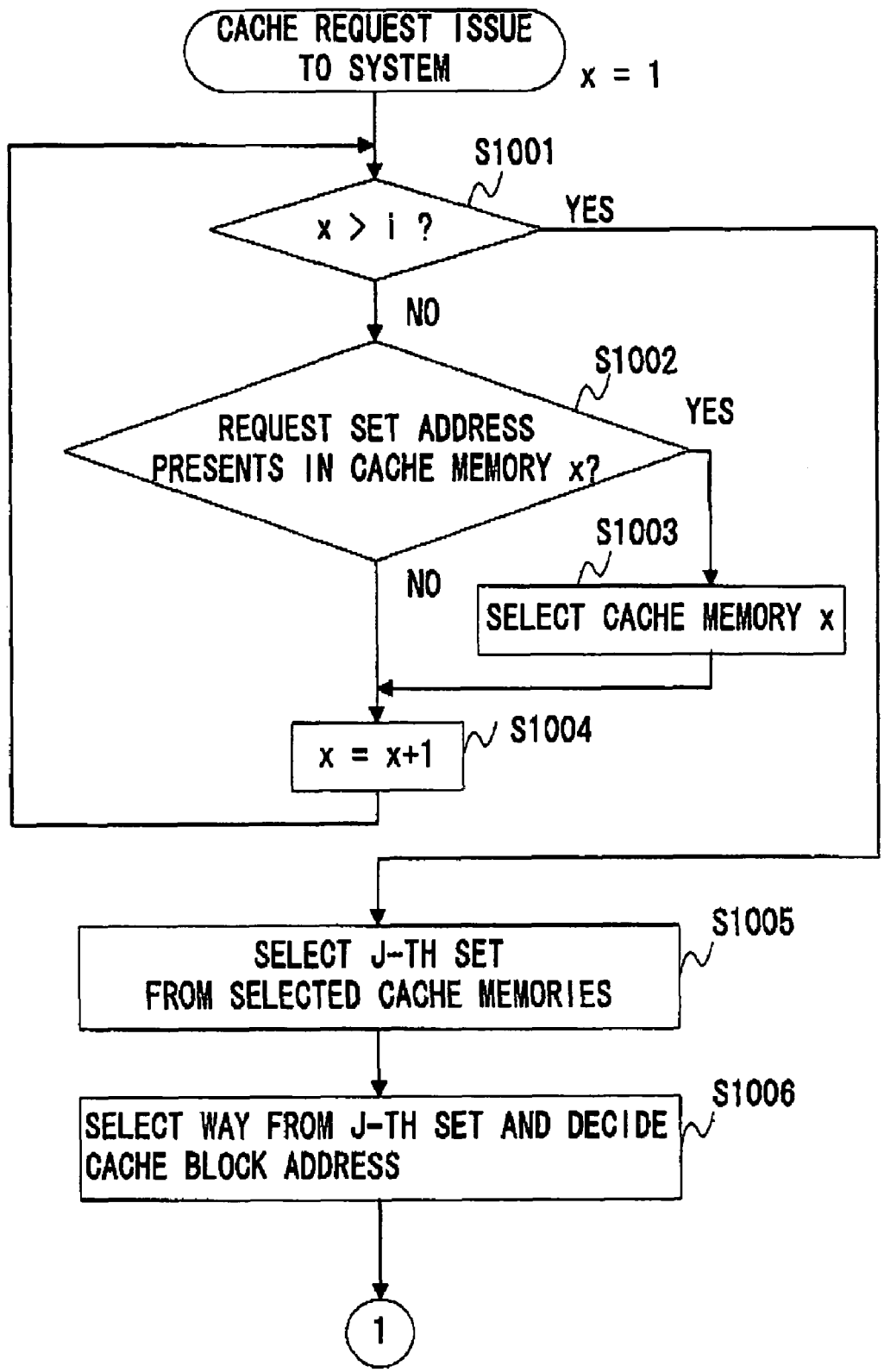
FIG. 10 is a flowchart illustrating the operation of the m-way (n×i)-set and (m×i)-way n-set set associative cache system.
Figure 10B:
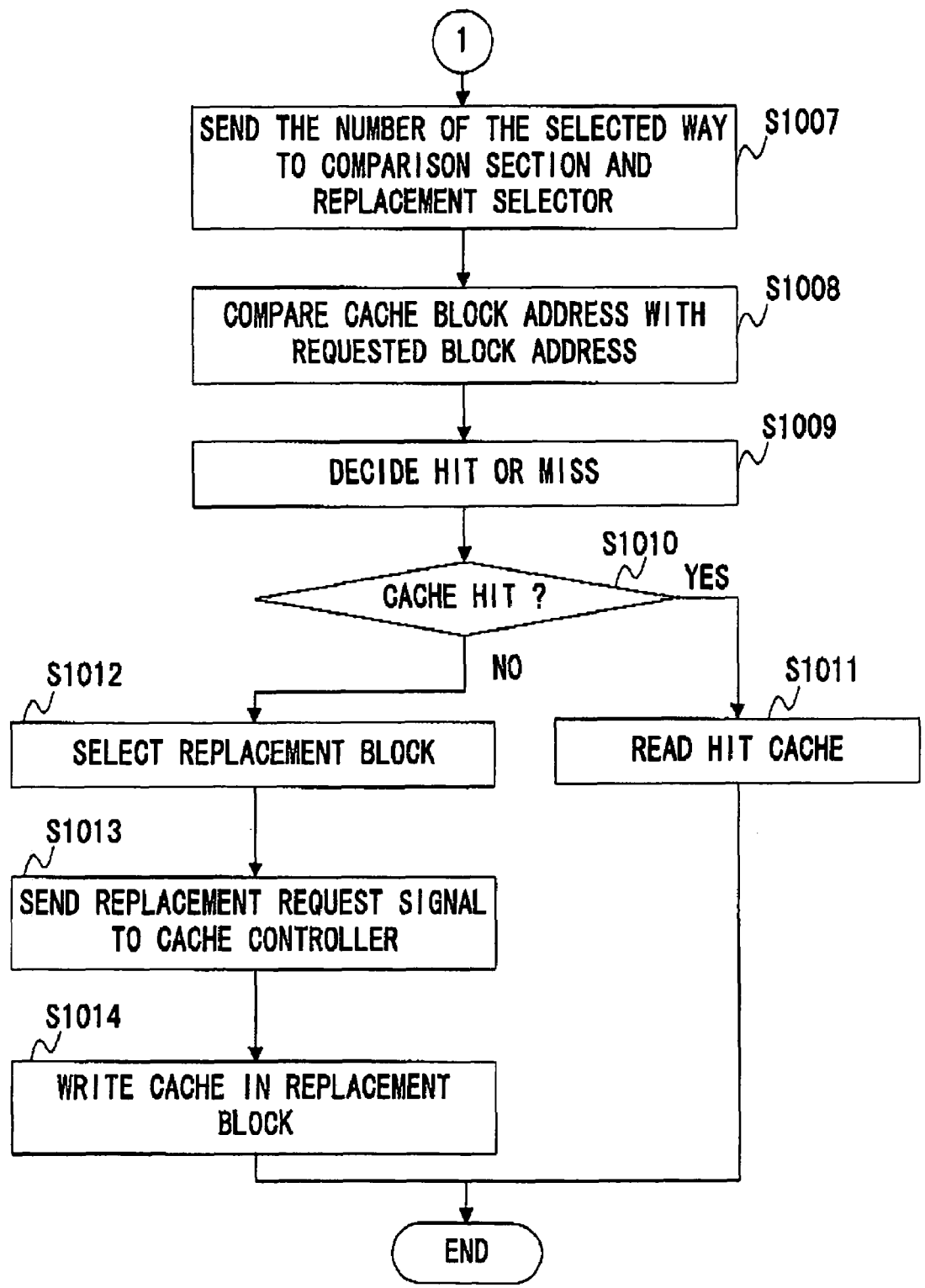

FIG. 10A and FIG. 10B are flowcharts illustrating the operation of making a cache hit decision in this case.

Referring to FIG. 9 and 10, the operation up to the cache hit decision of the cache system in this case will be described below.

The set address decoder selects a cache memory x in turn from 1 to i. If x, a number of the cache memory, is not greater than cache arrays number i (step S1001:No in FIG. 10A), the set address decoder decides whether a set address presents in cache memory x or not. If the requested set address presents in cache memory x (step S1002:Yes in FIG. 10A), the set address decoder selects the cache memory x (step S1003 in FIG. 10A). And, x is added 1 (step S1004 in FIG. 10A), and the set address decoder decides again whether x is not greater than i (step S1001 in FIG. 10A). As a result, the set Address decoder selects all or one of i groups of cache arrays based on the cache address and the cache management information.

At this time, for the cache configuration of m ways and (i×n) sets, one set comprises a single cache array, so that it is a single cache array that is selected by the set address decoder.

For the cache configuration of (i×m) ways and n sets, one set comprises all of i cache arrays, so that it is the entire i cache arrays that are selected by the set address decoder.

Based on the cache address and the cache management information, the set address decoder further selects the j-th set in the previously selected cache memories where j is an integer not less than 1 but not greater than n(step S1005 in FIG. 10A).

The way selector selects a way from the j-th set based on the cache management information and the LRU bit, and decides a cache block address (step S1006 in FIG. 10A).

The way selector sends the number of the selected way to the comparison sections laid out by the number of the cache arrays (i in this case) and one replacement sector (step S1007 in FIG. 10B).

Each comparison section compares the block address of the cache block, selected by the set address decoder and the way selector, with the requested block address, and sends the result to the hit decision circuit (step S1008 in FIG. 10B).

The hit decision circuit performs a decision on cache hit/miss based on the outputs of the way selector and the individual comparison sections (step S1009 in FIG. 10B), and sends a miss-hit signal including information indicating whether or not there is a cache hit to the cache controller and the replacement sector.

When the result of the cache hit/miss decision indicates a cache hit (step 1010:Yes in FIG. 10B), th cache controller reads a hit cache from the cache block (step S1011 in FIG. 10B). In this case, no cache replacement takes place.

When there is no cache hit (step S1010:No in FIG. 10B), the replacement sector selects a replacement block based on the input from the way selector and the information indicative of a cache hit or a miss from the hit decision circuit (step S1012 in FIG. 10B).

Then the replacement sector sends a replacement request signal to the cache controller (step S1013 in FIG. 10B). The cache controller newly writes a cache in the selected replacement block (step S1014 in FIG. 10).

This structure can provide a variable set associative cache stem comprising, for example, m ways and (i×n) sets of set associative caches and (i×m) ways and n sets of set associative caches.

In this case, the cache system has a merit such that even when the number of sets and the number of ways are changed, the positions of cache blocks corresponding to the same cache address do not change. The cache system has another merit such that even when the number of sets and the number of ways are changed, the available cache capacity does not change.

Various embodiments and changes may be made thereunto without departing from the broad spirit and scope of the invention. The abovedescribed embodiment is intended to illustrate the present invention, not to limit the scope of the present invention. The scope of the present invention is shown by the attached claims rather Oman the embodiment. Various modifications made within the meaning of an equivalent of the claims of the invention and within the claims are to be regarded to be in the scope of the present invention.

This application is based on Japanese Patent Application No. 2004-108286 filed on Mar. 31, 2004 and including specification, claims drawings and summary. The disclosure of the above Japanese Patent Application is incorporated herein by reference in its entirety.

What is claimed is:

1. A set associative cache system comprising:
   i groups of m ways and n sets of cache memories where i is a multiplier of 2 equal to or greater than 2, m and n are each a multiplier of 2 equal to or greater than 2;
   a set selecting section which selects all or one of said i groups of cache memories based on a cache address and cache management information, and selects a j-th set of cache memories in said selected cache memories according to said cache address where j is an integer not less than 1 but not greater than n;
   a way selecting section which selects a way based on said cache management information;
   a decision section which compares a block address of a cache block in said way selected by said way selecting section with a block address of a requested cache block, and decides whether there is a cache hit or a miss; and
   a replacement selecting section which selects a replacement block based on a decision result from said decision sections,
   wherein said set associative cache system functions as one of m ways and (i×n) sets set associative caches and (i×m) ways and n sets set associative caches, according to a number of systems executing in parallel.

2. The set associative cache system according to claim 1, wherein said cache address includes a block address and a set address, and
   said cache management information includes information about a process unit.

3. The set associative cache system according to claim 1, wherein said way selecting section selects a way based on LRU information of a cache block together with said cache management information, and
   said replacement selecting section selects a replacement block based on said LRU information of said cache block together with said cache management information.

4. The set associative cache system according to claim 1, wherein said way selecting section selects a way based on LRU information of a cache block and information on process allocation to each way together with said cache management information, and
   said replacement selecting section selects a replacement block based on said LRU information of said cache block and said information on process allocation to each way together with said cache management information.

5. A set associative cache system comprising:
   i groups of m ways and n sets of cache memories where i is a multiplier of 2 equal to or greater than 2, m and n are each a multiplier of 2 equal to or greater than 2;
   a set selecting section which selects all or one of said i groups of cache memories based on a cache address and cache management information, and selects a j-th set of cache memories in said selected cache memories according to said cache address where j is an integer not less than 1 but not greater than n,
   wherein said cache management information includes information indicative of a system status, information indicative of a process status, information indicative of a thread status, and memory sharing information;
   a way selecting section which selects a way based on said cache management information;
   a decision section which compares a block address of a cache block in said way selected by said way selecting section with a block address of a requested cache block, and decides whether there is a cache hit or a miss; and
   a replacement selecting section which selects a replacement block based on a decision result from said decision section.

6. A set associative cache system comprising:
   i groups of m ways and n sets of cache memories where i is a multiplier of 2 equal to or greater than 2, m and n are each a multiplier of 2 equal to or greater than 2;
   a set selecting section which selects all or one of said i groups of cache memories based on a cache address and cache management information, and selects a j-th set of cache memories in said selected cache memories according to said cache address where j is an integer not less than 1 but not greater than n;

a way selecting section which selects a way based on said cache management information;

a decision section which compares a block address of a cache block in said way selected by said way selecting section with a block address of a requested cache block, and decides whether there is a cache hit or a miss; and a replacement selecting section which selects a replacement block based on a decision result from said decision section, wherein a location of a cache block corresponding to a same cache address does not change even when a number of sets and a number of ways are changed.

7. A set associative cache system comprising:

i groups of m ways and n sets of cache memories where i is a multiplier of 2 equal to or greater than 2, m and n are each a multiplier of 2 equal to or greater than 2;

a set selecting section which selects all or one of said i groups of cache memories based on a cache address and cache management information, and selects a j-th set of cache memories in said selected cache memories according to said cache address where j is an integer not less than 1 but not greater than n;

a way selecting section which selects a way based on said cache management information;

a decision section which compares a block address of a cache block in said way selected by said way selecting section with a block address of a requested cache block, and decides whether there is a cache hit or a miss; and a replacement selecting section which selects a replacement block based on a decision result from said decision section, wherein an available cache capacity does not change even when a number of sets and a number of ways are changed.

8. A method of controlling a set associative cache memory, comprising, for i groups of m ways and n sets of cache memories:

selecting all or one of said i groups of cache memories based on a cache address and cache management information, and selecting a j-th set of cache memories in said selected cache memories according to said cache address;

selecting a way based on said cache management information;

comparing a block address of a cache block in said selected way in said selected set with a requested block address in said cache address, and deciding whether there is a cache hit or a miss; and selecting a replacement block based on a decision results, wherein said set associative cache system functions as one of m ways and (i×n) sets set associative caches and (i×m) ways and n sets set associative caches according to a number of systems executing in parallel.

\* \* \* \* \*